No. 795,039. PATENTED JULY 18, 1905.
J. HOFFMANN.
CURTAIN POLE.
APPLICATION FILED MAR. 6, 1905.
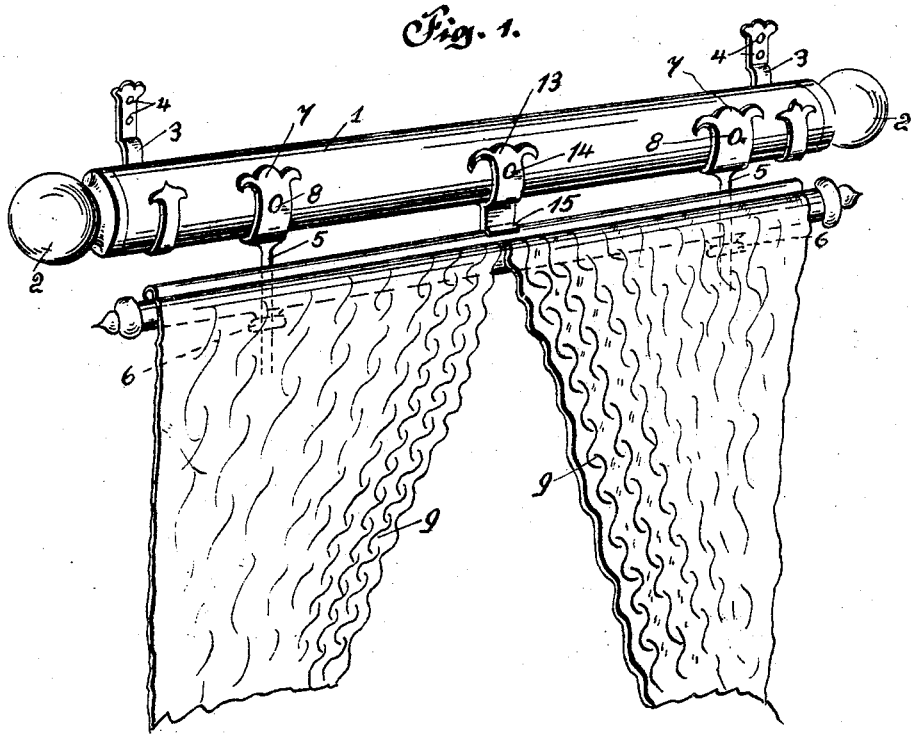
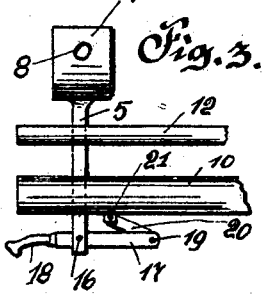 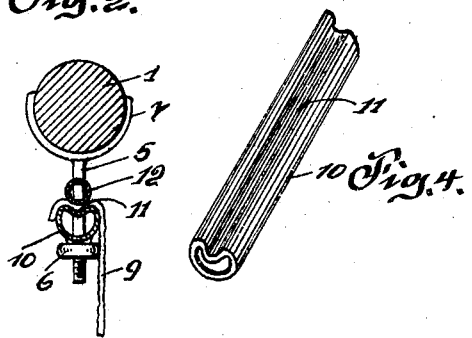
Witnesses:
C. Klostermann
E. E. Potter
Inventor.
John Hoffmann.
H. C. Everett Co.
Attorneys.

No. 795,039. Patented July 18, 1905.

UNITED STATES PATENT OFFICE.

JOHN HOFFMANN, OF SCOTT TOWNSHIP, ALLEGHENY COUNTY, PENNSYLVANIA.

CURTAIN-POLE.

SPECIFICATION forming part of Letters Patent No. 795,039, dated July 18, 1905.

Application filed March 6, 1905. Serial No. 248,601.

*To all whom it may concern:*

Be it known that I, JOHN HOFFMANN, a citizen of the United States of America, residing in Scott township, in the county of Allegheny and State of Pennsylvania, have invented certain new and useful Improvements in Curtain-Poles, of which the following is a specification, reference being had therein to the accompanying drawings.

This invention has relation to curtain-poles, and has for its object the provision of a curtain-pole of novel form and construction in which a curtain or curtains may be draped and suspended without employing hooks, pins, or other devices of like character which would penetrate the curtains and which are objectionable on account of their liability to tear the curtains when a pull is given to the curtains in adjusting or draping the same.

In carrying my invention into effect I provide the main curtain-pole, which is mounted in brackets secured to the window-frame, and in connection with this main pole I employ a supplementary pole that is adjustably attached to the main pole and carries a rod, between which and said supplementary pole the curtains are firmly clamped, so as to retain them in position.

The details of construction of my device will be hereinafter fully set forth and are illustrated in the accompanying drawings, wherein—

Figure 1 is a perspective view of my improvement. Fig. 2 is a vertical transverse sectional view of the same. Fig. 3 is a fragmentary front elevation of a modified form, and Fig. 4 is a fragmentary perspective view of the supplementary pole.

The main pole 1 is of the ordinary form now extensively used and consists of a round wooden pole having suitably attached or integral ornamental end pieces 2 2. The pole 1 is attached to the window-frame by means of stirrups or hooks 3 3, which are pierced at 4 for the reception of screws or pins to attach them to the window-frame. A plurality of depending hangers 5 5, which are screw-threaded on their lower ends and which carry nuts 6 6, are secured to the pole 1, being formed for that purpose with bifurcated and flattened upper ends 7, which embrace the pole and are pierced for the reception of screws 8. The supplementary pole, upon which the curtains 9 9 are draped, is preferably hollow and formed of thin metal, this pole, which is designated 10, being shown in section in Fig. 2 and is indented on top, so as to form a shallow groove 11, in which a rod 12 rests, the curtains 9 being hung over the supplementary pole 10 and held in position thereon by the rod 12. The supplementary pole 10 and the rod 12 are pierced for the passage therethrough of the hangers 5 and slide up and down on the hangers, being adjusted to the desired position by means of nuts 6. The stop 13 is arranged at the center of the main pole 1 and attached thereto by a screw 14, this stop being formed with a laterally-projecting lug 15 on its lower end, which lug when the supplementary pole and the rod 12 have been raised a sufficient distance by the screws 6 bear on top of the rod 12 and serve to maintain the same in close contact with the supplementary pole 10, the curtain of course, as before mentioned, intervening between the rod 12 and the pole 10 and being held in position upon the supplementary pole by said rod, which, as before stated, rests in the groove 11 of the supplementary pole.

In Fig. 3 of the drawings I have shown a modified form of my improvement wherein the hanger 5, having its lower end pierced for the passage of a pin 16, which pivotally supports a lever 17, has a handle 18 at its outer end, and which lever is pivotally connected at 19 to a link 20, that is in turn pivotally connected at 20 to the supplementary pole 10. In this construction the supplementary pole 10 is brought up against the bottom of the rod 12 by pulling down the handle 18 of the lever 17, this movement elevating the pole 10 and bringing the pivotal points 16, 19, and 21 into alinement, so that the lever 17 and link 20 sustain the pole 10 in the required elevated position.

In using the device above set forth the stirrups 3 3 are attached to the window-frame, and the main pole 1 is suspended in these stirrups, the supplementary pole 10 and the rod 12 being at this time suspended from the main pole on the hangers 5, the nuts 6 being at this time screwed down toward the lower end of the hangers. The upper ends of the curtains 9 9 are now inserted between the supplementary pole 10 and the rod 12, so much of the upper end of the curtains as is necessary being drawn through and allowed to lap over and hang down over the inner side of the supplementary pole 10, as is necessary to secure the proper adjustment of the lower ends of the curtains relatively to the floor. The nuts 6 6 are now screwed up until in the upward movement of the rod 12 it encounters the lug 15, and the further movement of the screws will press the supplementary pole upwardly toward the rod 12 and bind the curtains between said pole and said rod. To release the curtains and remove them from the pole, it is only necessary to turn the nuts slightly, so as to cause them to move down the hangers 6 and then pull the curtains out from between the supplementary pole 10 and the rod 12. When the modified form of device shown in Fig. 3 is employed, the curtains are placed as before between the supplementary pole 10 and the rod 12 and then by pulling down the handles 18 of the levers 17, one of which levers will of course be mounted on each of the hangers 5, the rod 12 and the pole 10 will be elevated until the rod comes into contact with the lug 15 of the stop 13, whereupon the curtains will be held as before by the impression of the supplementary pole against the rod. The main pole 1, it will be observed, serves merely as a means for suspending the supplementary pole from the window-frame, and it will be observed that when desired the entire structure—that is, the main pole and the supplementary pole and the binding-rod 12—may be all detached from the window-frame and taken down by merely lifting the main pole 1 out of the hangers 3 3 and without removing the curtains from the supplementary pole, and this construction is a very advantageous one, as it enables the curtains to be speedily detached from the window and taken down when it is desired to wash the windows or when for any reason it is desired to temporarily remove the curtains. The replacement of the pole 1 in the brackets 3 3 is of course as readily accomplished as the removal thereof, and the entire device obviates the necessity of unfastening the curtains from their supporting means when it is desired to temporarily remove the curtains from the window-frame.

What I claim, and desire to secure by Letters Patent, is—

1. In a device of the character described, the combination of a main pole, means for removably attaching said main pole to a window-frame, hangers carried by said main pole and having screw-threaded lower ends, nuts screwing on said hangers, a supplementary pole having a groove in its upper side, a rod fitting into said groove, said supplementary pole and said rod being perforated for the passage of said hangers, and supported by said nuts, and a stop carried by the main pole and adapted to contact with the said rod.

2. In a device of the character described, the combination of a main pole, means for attaching said pole to a window-frame, hangers carried by said main pole, a supplementary pole and a rod carried by said hangers, a stop carried by the main pole, and means for moving the supplementary pole and the rod upon the said hangers to bring the rod into contact with said stop.

In testimony whereof I affix my signature in presence of two witnesses.

JOHN HOFFMANN.

Witnesses:
E. E. POTTER,
H. C. EVERT.